(12) United States Patent
Ro et al.

(10) Patent No.: US 11,874,428 B2
(45) Date of Patent: Jan. 16, 2024

(54) METHOD FOR DECIDING SEEDING EFFECT AREA AND NON-SEEDING EFFECT AREA IN ACCORDANCE WITH WIND SYSTEM

(71) Applicant: National Institute of Meteorological Sciences, Jeju-do (KR)

(72) Inventors: Yonghun Ro, Jeju-do (KR); Ki-Ho Chang, Seoul (KR); Sanghee Chae, Jeju-do (KR); Joo-Wan Cha, Jeju-do (KR); Yunkyu Im, Jeju-do (KR); Woonseon Jung, Jeju-do (KR)

(73) Assignee: National Institute of Meteorological Sciences, Jeju-do (KR)

( * ) Notice: Subject to any disclaimer, the term of this patent is extended or adjusted under 35 U.S.C. 154(b) by 0 days.

(21) Appl. No.: 17/562,334

(22) Filed: Dec. 27, 2021

(65) Prior Publication Data

US 2023/0184994 A1    Jun. 15, 2023

(30) Foreign Application Priority Data

Dec. 9, 2021 (KR) .................. 10-2021-0175351

(51) Int. Cl.
  *G01W 1/10* (2006.01)
  *G01S 13/95* (2006.01)
  *G01W 1/14* (2006.01)

(52) U.S. Cl.
  CPC ............... *G01W 1/10* (2013.01); *G01S 13/95* (2013.01); *G01W 1/14* (2013.01)

(58) Field of Classification Search
  CPC ........... G01W 1/10; G01W 1/14; G01S 13/95
  See application file for complete search history.

(56) References Cited

U.S. PATENT DOCUMENTS

| 9,589,473 | B1 * | 3/2017 | Seo ..................... G01S 13/953 |
| 2010/0170958 | A1 * | 7/2010 | Rosenfeld ............. A01G 15/00 239/2.1 |
| 2018/0082001 | A1 * | 3/2018 | Yang ..................... A01G 15/00 |
| 2018/0292826 | A1 * | 10/2018 | DeFelice ............... A01G 15/00 |

FOREIGN PATENT DOCUMENTS

WO    WO-2008072227 A1 *  6/2008  ............ A01G 15/00

* cited by examiner

*Primary Examiner* — Yoshihisa Ishizuka
(74) *Attorney, Agent, or Firm* — WRB-IP PLLC (57) ABSTRACT

The present invention relates to a method for determining a seeding effect area and a non-seeding effect area in accordance with a wind system according to the present invention can use numerical simulation data, radar precipitation data, and ground precipitation data to systematically specify the steps of determining the seeding effect area and the non-seeding effect area in accordance with the wind system. Moreover, the method according to the present invention can easily divide the seeding effect area and the non-seeding effect area according to the physical properties of clouds and quantitatively verify the effectiveness of artificial precipitation experiments conducted by purpose in the future.

2 Claims, 4 Drawing Sheets

(2 of 4 Drawing Sheet(s) Filed in Color)

METHOD FOR DECIDING SEEDING EFFECT AREA AND NON-SEEDING EFFECT AREA IN ACCORDANCE WITH WIND SYSTEM

BACKGROUND OF THE INVENTION

Cross Reference to Related Application of the Invention

The present application claims the benefit of Korean Patent Application No. 10-2021-0175351 filed in the Korean Intellectual Property Office on Dec. 9, 2021, the entire contents of which are incorporated herein by reference.

FIELD OF THE INVENTION

The present invention relates to a method for determining a seeding effect area and a non-seeding effect area in accordance with a wind system, and more specifically, to a method for determining a seeding effect area and a non-seeding effect area in accordance with a wind system that is capable of using numerical simulation data, radar precipitation data, and ground precipitation data to systematically specify steps of determining the seeding effect area and the non-seeding effect area in accordance with the wind system.

BACKGROUND OF THE RELATED ART

Efforts to minimize damages caused by forest fires, drought, and fine particles through artificial precipitation experiments have been made by National Institute of Meteorological Sciences (NIMS) in Korea on 2021. Through the artificial precipitation experiments, water resources are generated to thus increase effective humidity of mountainous terrains, secure an amount of water stored in a dam, and reduce a fine particle concentration in the atmosphere.

The artificial precipitation experiment is a process of spraying a seeding material onto clouds, changing physical properties of cloud particles, and increasing precipitation, and the effectiveness of the artificial precipitation experiment is verified using a numerical model, remote sensing equipment, ground observation sensors, and the like.

Existing studies (Al Hosari et al., 2021) on the calculation of artificial precipitation through long-term statistical analysis of various experiment results are made, but it is considered that it is hard to quantitatively verify precipitation enhancement according to characteristics of clouds introduced in a seeding effect area. Further, analysis methods, which are available in relation with artificial precipitation experiments, are not sufficiently provided.

A representative approach to the calculation of precipitation enhancement through the artificial precipitation experiment is a method of distinguishing a seeding effect area from a non-seeding effect area to analyze differences between physical properties of systems distributed in the two areas.

The method is disclosed in Korean Patent No. 2327194 (hereinafter, referred to as prior art), and as explained in the prior art, the amount of water available can be calculated according to an experiment.

A point having longest seeding effect is determined as a seeding effect area, and a non-seeding effect area is determined in consideration of diffusion data on a district having similar system and meteorological and topographic conditions to the seeding effect area.

The determining methods of the two areas are conducted in consideration of the diffusion range of a seeding material.

However, diffusion speeds may be different by experiment, so that it is hard to determine the area having longest seeding effect, and if the diffusion occurs entirely in Korea, it is harder to determine the non-seeding effect area. In the case of a cold front or mountainous terrain where a precipitation system moves fast or even in the case of a weak precipitation intensity, it is really harder to determine the non-seeding effect area.

SUMMARY OF THE INVENTION

Accordingly, the present invention has been made in view of the above-mentioned problems occurring in the related art, and it is an object of the present invention to provide a method for determining a seeding effect area and a non-seeding effect area in accordance with a wind system that is capable of using numerical simulation data, radar precipitation data, and ground precipitation data to systematically specify steps of determining the seeding effect area and the non-seeding effect area in accordance with the wind system.

It is another object of the present invention to provide a method for determining a seeding effect area and a non-seeding effect area in accordance with a wind system that is capable of easily distinguishing the seeding effect area from the non-seeding effect area according to the physical properties of clouds and quantitatively verifying the efficiency of artificial precipitation experiments conducted by purpose in the future.

To accomplish the above-mentioned objects, according to the present invention, there is provided a method for determining a seeding effect area and a non-seeding effect area in accordance with a wind system, the method including: an analysis time determining step of determining, after a seeding material is applied to generate artificial precipitation of a target district, analysis time according to numerical model artificial precipitation change time of the seeding material; a simulation area determination step of determining a main precipitation change district of an artificial precipitation numerical simulation as a simulation area; seeding effect area determination step of determining the seeding effect area around a district where radar precipitation change is greatest in the simulation area; and a non-seeding effect area determination step of determining the non-seeding effect area, depending on whether a direction of numerical simulation artificial precipitation, which is caused by the wind system, is the same as a direction of a precipitation band.

According to the present invention, in specific, the non-seeding effect area determination step may include the steps of: if the direction of the numerical simulation artificial precipitation, which is caused by the wind system, is the same as the direction of the precipitation band, determining the non-seeding effect area around a seeding line on up wind; and if the direction of the numerical simulation artificial precipitation, which is caused by the wind system, is not the same as the direction of the precipitation band, determining the non-seeding effect area around the strongest precipitation point among the same natural precipitation system as of the seeding effect area, while being not overlaid onto the simulation area.

The patent or application file contains at least one drawing executed in color. Copies of this patent or patent application publication with color drawing(s) will be provided by the Office upon request and payment of the necessary fee.

BRIEF DESCRIPTION OF THE DRAWINGS

The above and other objects, features and advantages of the present invention will be apparent from the following detailed description of the embodiments of the invention in conjunction with the accompanying drawings, in which.

DETAILED DESCRIPTION OF THE EMBODIMENTS

Hereinafter, an explanation of a method for determining a seeding effect area and a non-seeding effect area in accordance with a wind system according to embodiments of the present invention will be given with reference to the prior art and the attached drawings, and objects, characteristics and advantages of the present invention will be more clearly understood from the embodiments of the present invention as will be described below.

Figure 1:
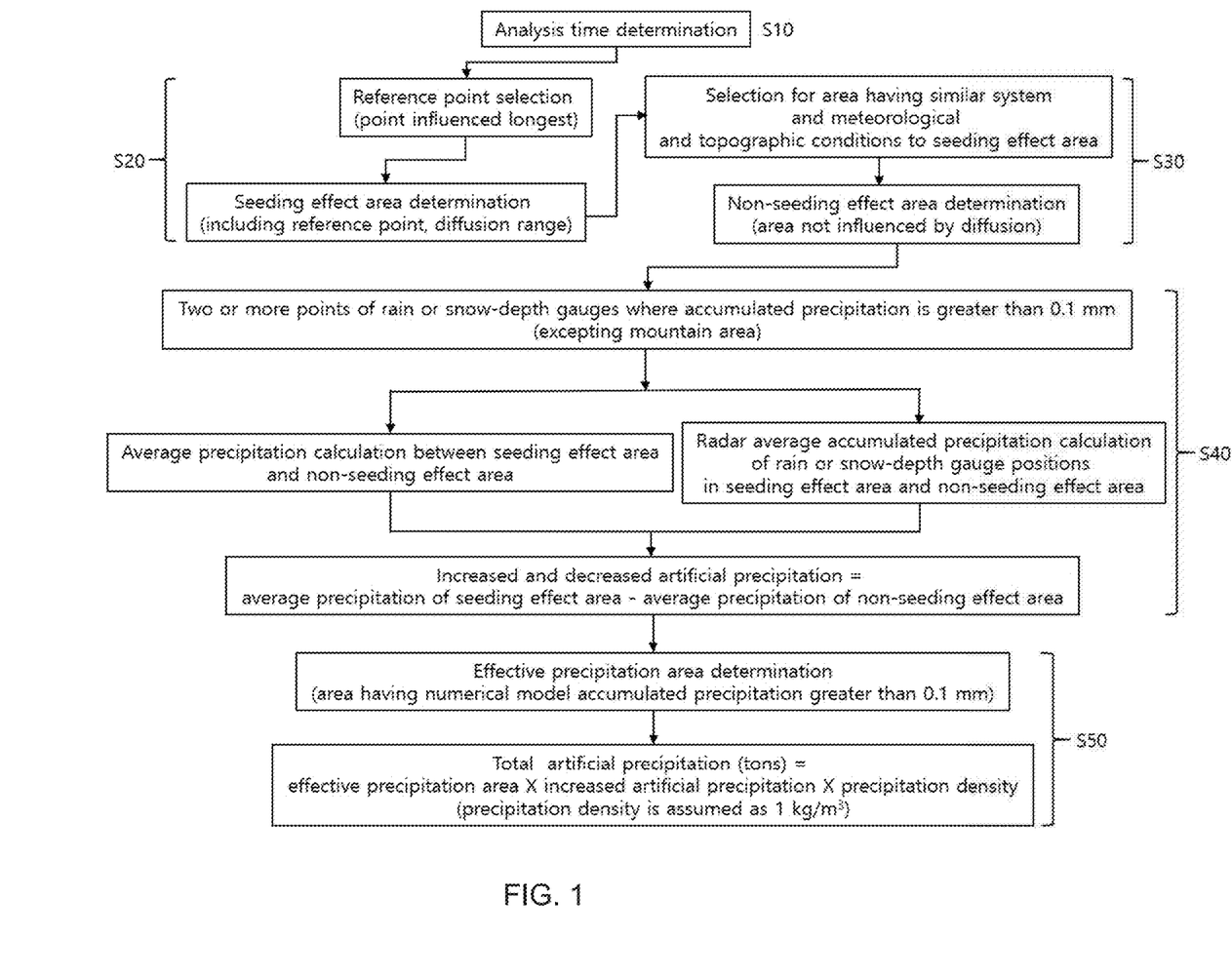
FIG. 1 is a flowchart showing a method for calculating total artificial precipitation on a seeding effect area compared to a non-seeding effect area in the prior art.

First, a method for determining a seeding effect area and a non-seeding effect area in accordance with a wind system according to the present invention is based on Korean Patent No. 2327194 as issued to the same applicant as the invention, which will be understood with reference to FIG. 1.

FIG. 1 is a flowchart showing a method for calculating total artificial precipitation on a seeding effect area compared to a non-seeding effect area according to the prior art.

As shown in FIG. 1, a method for calculating total artificial precipitation on a seeding effect area compared to a non-seeding effect area according to the prior art is carried out by calculating, after a seeding material is sprayed onto an experiment area to provide artificial precipitation for a target district, total artificial precipitation of a seeding effect area compared to a non-seeding effect area, to completely remove precipitation shortage through the artificial precipitation generated through the seeding material.

So as to achieve drought damage reduction, forest fire prevention, fog reduction, and the like, recently, weather modification experiments have been actively taken by NIMS in Korea.

Through the weather modification, accordingly, precipitation in meteorological conditions is controlled to prepare all kinds of damages and to supply water resources stably.

For the weather modification, silver iodide (AgI) acting as a nucleus of an ice crystal, which is applied to cold clouds (with a temperature less than 0° C.), is used as a seeding material, and calcium chloride ($CaCl_2$) acting as a hygroscopic seeding material, which is applied to warm clouds (with a temperature greater than 0° C.), is used as a seeding material. A process of colliding the seeding material against naturally distributed cloud droplets and fusing them together is controlled to provide a series of processes through which clouds capable of producing precipitation can grow.

Generally, a process of increasing an amount of rainfall is sorted as artificial increasing of rain, and a process of increasing an amount of snowfall as artificial increasing of snow.

Seeding experiments in which a seeding material such as calcium chloride ($CaCl_2$) or silver iodide (AgI) is sprayed on various cloud systems ranging from stratus to mid-level clouds through an aircraft have been taken by NIMS in Korea as the applicant of the invention.

So as to verify an effect of the seeding material on precipitation enhancement, further, ground observation networks are built and operate.

Basically, precipitation changes in an area where a seeding effect is predicted are analyzed according to a precipitation change simulation result of a numerical model. However, it is hard to trace whether natural precipitation is introduced into seeded clouds or the seeding material moves to any direction, and accordingly, it is not easy to quantitatively determine an increasing amount of rainfall or snowfall, that is, artificial precipitation.

Therefore, it is recognized that a method for logically estimating a seeding effect through comparison with observation data is needed.

To do this, according to the prior art, an area influenced by the seeding material and an area not influenced by the seeding material are divided to verify a seeding effect on precipitation enhancement after a weather modification experiment has been taken, and as a result, artificial precipitation enhanced is quantitatively calculated.

This suggests an approach method of separating increased precipitation through seeding from a natural precipitation system distributed in a seeding area, and next, a numerical simulation result and observation data are compared to each other to estimate performance of a numerical model. Further, an amount of water available through a weather modification experiment is calculated using artificial precipitation of the seeding effect area.

So as to calculate total artificial precipitation increased after the artificial precipitation experiment using aircraft, according to the prior art, the seeding effect area and the non-seeding effect area are divided using diffusion and non-diffusion data, ground precipitation data, radar precipitation data, meteorological conditions, topographic conditions, and the like.

Further, according to the prior art, a method for quantitatively determining precipitation increased through the seeding material is provided to have an amount of water available through the artificial precipitation experiment, thereby providing plans capable of solving drought.

According to the prior art, in specific, the method for calculating the total artificial precipitation of the seeding effect area compared to the non-seeding effect area is carried out by dividing the seeding effect area and the non-seeding effect area using seeding material diffusion field, accumulated precipitation change of numerical model, meteorological conditions, ground accumulated precipitation data, radar accumulated precipitation data, and the like, thereby quantitatively calculating the total artificial precipitation available through the weather modification experiment.

The method largely includes analysis time determining step S10, seeding effect area setting step S20, non-seeding effect area setting step S30, increased and decreased artificial precipitation determining step S40, and total artificial precipitation (an amount of water available) calculating step S50.

In specific, the method for calculating the total artificial precipitation of the seeding effect area compared to the non-seeding effect area according to the prior art includes analysis time determining step S10 of setting a period of time having an influence on rain or snow-depth gauges of a target district, while a seeding material sprayed onto an experiment area is being distributed; seeding effect area setting step S20 of setting the seeding effect area including a diffusion range of the seeding material, while setting a point where artificial precipitation on the target district appears most on the rain or snow-depth gauges through the diffusion of the seeding material sprayed onto the experiment area; non-seeding effect area setting step S30 of setting the non-seeding effect area on the same conditions as the seeding effect area; if there are two or more points where accumulated precipitation is greater than 0.1 mm among the rain or snow-depth gauges distributed on the seeding effect area and the non-seeding effect area, increased and decreased artificial precipitation determining step S40 of calculating a average value using precipitation data of the two or more points to analyze the increased and decreased artificial precipitation as a average difference between precipitation of the seeding effect area and precipitation of the non-seeding effect area; and total artificial precipitation calculating step S50 of determining an area where increased accumulated precipitation is greater than 0.1 mm as an effective area if increased precipitation occurs in the seeding effect area to calculate the total artificial precipitation, thereby calculating an amount of water available through the weather modification experiment using the total artificial precipitation on the seeding effect area and ensuring an amount of water available through the artificial precipitation experiment to provide plans capable of solving drought.

In more specific, the method for calculating the total artificial precipitation of the seeding effect area compared to the non-seeding effect area according to the prior art will be explained below.

Analysis Time Determining Step (S10)

The analysis time is determined as a period of time having an influence of a seeding material in a diffusion field on rain or snow-depth gauges of a target district. This step is a process of determining total accumulated time during which it is expected that precipitation is increased by the influence of the seeding material, and the analysis time is determined as diffusion on a numerical model and accumulated precipitation increasing and decreasing time. For example, in the case of an influence of natural precipitation is less, total time having an influence of the seeding material on the target district is considered, but in the case of an influence of natural precipitation is great, the analysis time is relatively short to prevent accumulated precipitation from being maximized.

Seeding Effect Area Setting Step (S20)

A point, which is influenced most by the seeding material, among the rain or snow-depth gauges at which ground precipitation appears in a diffusion range of the seeding material, is determined as a reference point. The seeding effect area is determined in consideration with a range where the seeding material is distributed as well as the reference point. Accordingly, the seeding effect area is determined according to a diffusion district.

Non-Seeding Effect Area Setting Step (S30)

The non-seeding effect area is set as an area not influenced by the diffusion of the seeding material on the meteorological and topographic conditions (observed altitudes) similar to the precipitation system distributed in the seeding effect area. If the seeding material is overall distributed in the same precipitation system to have no area influenced thereby or if there are no similar meteorological and topographic conditions to each other, the non-seeding effect area is set as the same area as the seeding effect area, and accumulated precipitation field data during a period of time before there is no influence by the seeding material is analyzed (but the analysis time is the same as before).

Increased and Decreased Artificial Precipitation Determining Step (S40)

The precipitation data only at points where accumulated precipitation is greater than or equal to 0.1 mm among the rain or snow-depth gauges distributed on the seeding effect area and the non-seeding effect area is used to calculate average precipitation. If the points satisfying the above conditions are less than two, radar accumulated precipitation, which is estimated by applying a First expression $Z=148\ R^{1.59}$ to hybrid surface rainfall (HSR) radar reflectivity data on each observatory position (but the radar estimation precipitation is adopted only if a degree of accuracy is greater than 60% when compared to rain gauges). In this case, radar precipitation is area average precipitation, but even the value calculated using data of the rain or snow-depth gauges is assumedly calculated as area average precipitation representing each area. Moreover, the observation values at the rain or snow-depth gauge positions distributed on the mountain districts of the respective areas are excluded from the calculation of the average value so as to eliminate topographic effects.

The increased and decreased artificial precipitation for verifying the seeding effect is indicated by an average accumulated precipitation difference (seeding effect area−non-seeding effect area) between the seeding effect area and the non-seeding effect area. If the difference is a positive value, rainfall or snowfall, that is, precipitation is increased in the seeding effect area, and if the difference is a negative value, precipitation is decreased in the seeding effect area.

Total Artificial Precipitation Calculating Step (S50)

If precipitation enhancement occurs in the seeding effect area, total artificial precipitation (tons) as an amount of water available through a weather modification experiment using the precipitation enhancement is determined. To do this, an effective area of the precipitation generation district has to be determined on accumulated precipitation simulation results. The effective precipitation area is an area of an estimated district where accumulated precipitation is greater than or equal to 0.1 mm among precipitation appearing on a numerical model. Further, the effective precipitation area is determined in consideration with only the area of the land where rain or snow-depth gauges are distributed.

The total artificial precipitation is calculated by multiplying the increased artificial precipitation as the average area accumulated precipitation calculated before the determination of the effective precipitation area by precipitation density, as suggested by the following Second expression.

Total artificial precipitation (tons)=Effective precipitation area×Increased artificial precipitation× Precipitation density In this case, precipitation area is indicated by m, and the average area accumulated precipitation by mm, so that unit conversion is needed. Further, the precipitation density is assumed as 1 kg/m$^3$ and calculated. The calculated value indicates the amount of water available through the seeding, thereby expressing the quantitative seeding effect with respect to the weather modification experiment.

Based on Korean Patent No. 2327194 as issued to the same applicant as the invention, a method for determining a seeding effect area and a non-seeding effect area in accordance with a wind system according to the present invention will be explained below.

Figure 2:
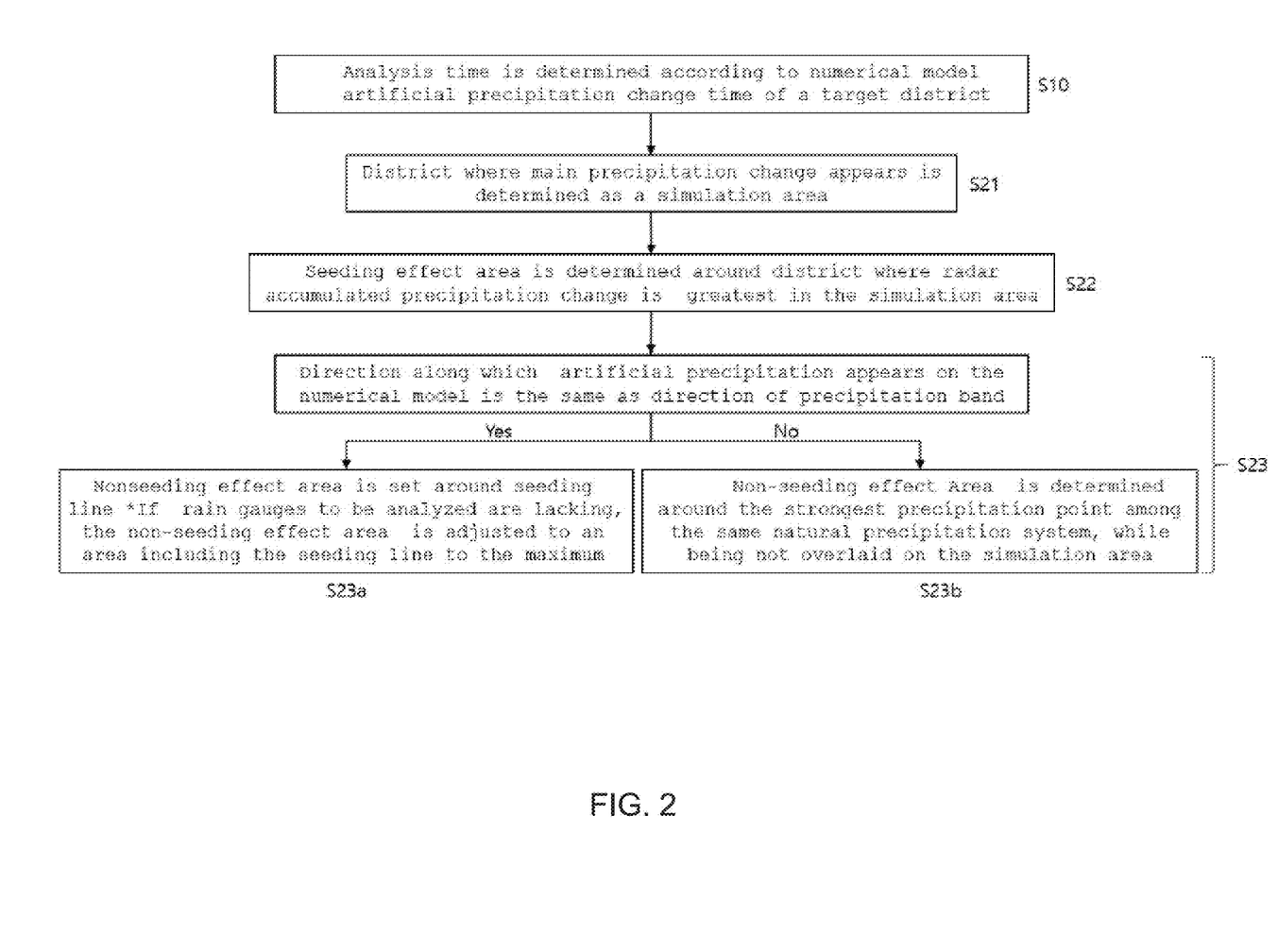
FIG. 2 is a flowchart showing a method for determining a seeding effect area and a non-seeding effect area in accordance with a wind system according to the present invention.

FIG. 2 is a flowchart showing a method for determining a seeding effect area and a non-seeding effect area in accordance with a wind system according to the present invention.

A method for determining a seeding effect area and a non-seeding effect area in accordance with a wind system according to the present invention is capable of specifically and systematically determining the seeding effect area and the non-seeding effect area.

According to the present invention, in specific, the seeding effect area and the non-seeding effect area are divided in accordance with the wind system introduced in an artificial precipitation experiment district using precipitation change simulation data and radar and ground accumulated precipitation data, thereby calculating purely increased precipitation that is obtained by excluding natural precipitation.

In this case, specifications for conducting the method for determining a seeding effect area and a non-seeding effect area in accordance with a wind system according to the present invention are as follows.

Configuration

Numerical model precipitation simulation: Main precipitation enhancement change simulation data around target district/(.png) file Radar accumulated precipitation: Radar accumulated precipitation during main precipitation enhancement change time/(.png) file Precipitation calculated using HSR reflectivity data having great influences on ground precipitation Temporal resolution: Five minutes, Spatial resolution: 1 km×1 km Radar precipitation calculation expression:

Rain: $Z=148 R^{1.59}$ Snow: $Z=2000 R^{2.0}$

Z: Reflectivity (mm$^6$/m$^3$), R: Precipitation intensity (mm/hr)

Ground accumulated precipitation: Rain or snow-depth gauge accumulated precipitation distribution during main precipitation enhancement change time/(.png) file In more specific, the method for determining a seeding effect area and a non-seeding effect area in accordance with a wind system according to the present invention determines the seeding effect area and the non-seeding effect area in accordance with the wind system of a precipitation system introduced in a target district when artificial precipitation experiment effectiveness is analyzed through the total artificial precipitation calculation method of the seeding effect area compared to the non-seeding effect area according to the prior art.

The method basically includes analysis time determining step S10, seeding effect area/non-seeding effect area setting steps S20 and S30, increased and decreased artificial precipitation determining step S40, and total artificial precipitation calculating step S50, which are suggested in the prior art.

In this case, the method for determining a seeding effect area and a non-seeding effect area in accordance with a wind system according to the present invention is carried out by specializing seeding effect area/non-seeding effect area setting steps S20 and S30 after analysis time of a numerical model has been determined in analysis time determining step S10 in the prior art.

So as to clearly express an area influenced by the artificial precipitation experiment and an area not influenced thereby, the area influenced by seeding, which is used in the prior art, is still used as the seeding effect area, but the area not influenced by seeding, which is used in the prior art, is defined as the non-seeding effect area.

Figure 3A:
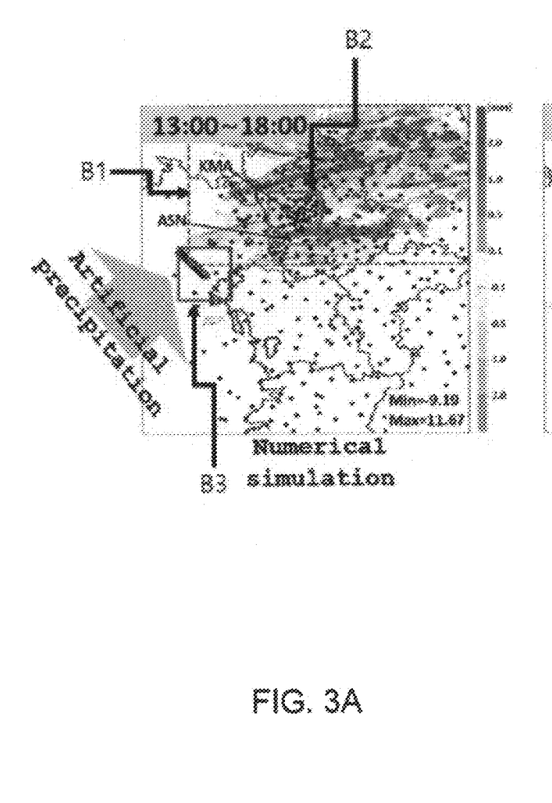
FIGS. 3A to 3C are domain images showing numerical simulation precipitation changes and ground and radar accumulated precipitation changes for five hours between 13:00 and 18:00 after the seeding effect area and the non-seeding effect area are separated in the case of an artificial precipitation experiment conducted to reduce a fine particle concentration in a capital region on Nov. 1, 2020 [In the case of the artificial precipitation experiment conducted on Nov. 1, 2020, boxes B1 of numerical simulation precipitation changes, ground accumulated precipitation, and radar accumulated precipitation indicate simulation areas, boxes B2 the seeding effect areas, boxes B3 the non-seeding effect areas, black solid lines seeding lines, KMA Korea Meteorological Administration, and ASN Ansan city]
Figure 3B:
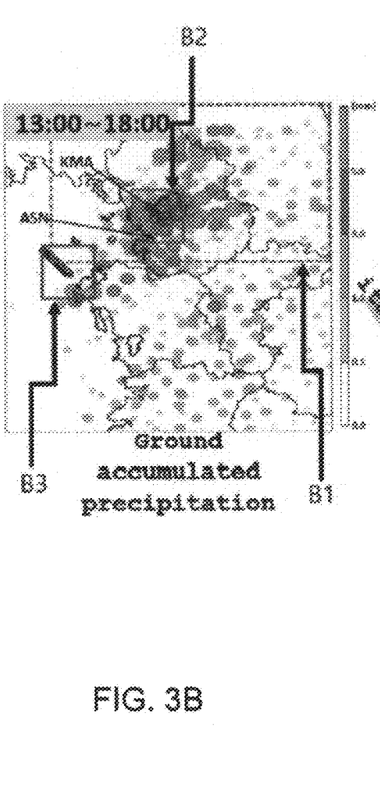
Figure 3C:
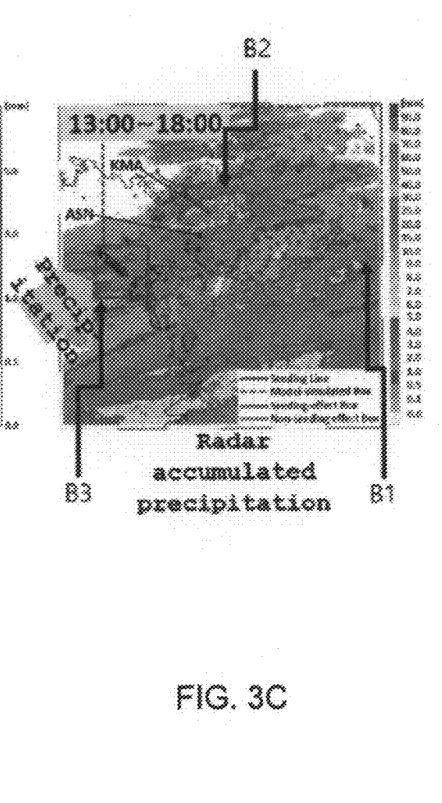

In this case, the two areas are determined temporally and spatially after the artificial precipitation experiment through the following method (See FIGS. 3A to 3C).

FIGS. 3A to 3C are domain images showing numerical simulation precipitation changes and ground and radar accumulated precipitation changes for five hours between 13:00 and 18.00 after the seeding effect area and the non-seeding effect area are separated in the case of an artificial precipitation experiment conducted to reduce fine particle concentration in a capital region on Nov. 1, 2020. In the case of the artificial precipitation experiment conducted on Nov. 1, 2020, boxes B1 of numerical simulation precipitation changes, the ground accumulated precipitation, and the radar accumulated precipitation indicate simulation areas, boxes B2 the seeding effect areas, boxes B3 the non-seeding effect areas, black solid lines seeding lines, KMA Korea Meteorological Administration, and ASN Ansan city.

(1) Analysis Time Determining Step (S10)

The analysis time for verifying a seeding effect is determined according to numerical model artificial precipitation change time of a target district, which follows the prior art. Accordingly, reference time in determining the seeding effect area B2 and the non-seeding effect area B3 is determined in accordance with a wind system.

(2) Simulation Area Determining Step (S21)

Unlike the existing method wherein the seeding effect area B2 is set as a point influenced longest by diffusion, the seeding effect area B2 according to the present invention is determined as a main precipitation change district of a numerical model. Because diffusion speeds are different according to experiments, in this case, it is hard to determine a specific point influenced longest by diffusion, and if diffusion occurs over the domain, the seeding effect area B2 cannot be limitedly determined. Time during which the main precipitation change of the numerical model is predicted is determined according to the analysis time suggested in the prior art. The box B1, which includes the district where the main precipitation change appears within the analysis time, is indicated on the domain, which is determined as a simulation area.

(3) Seeding Effect Area Determining Step (S22)

The seeding effect area B2 is determined around the district where the radar accumulated precipitation change is greatest in the range of the simulation area B1. The seeding effect area B2 is determined as an area of 50 km×50 km in consideration with the range where effective precipitation enhancement is verified on a precipitation system, which is indicated by the box B2 on the domain.

(4) Non-Seeding Effect Area Determining Step (S23)

The non-seeding effect area B3 is determined as an area of 50 km×50 km like the seeding effect area B2, depending on whether a direction along which artificial precipitation appears on the numerical model is the same as a direction of a precipitation system (band) introduced around the target district, which is indicated by the box B3 on the domain. To recognize a difference in characteristics of the seeding effect area B2 and the non-seeding effect area B3, the present invention has the two areas B2 and B3 with the same size as each other, unlike the prior art.

If it is determined that the direction along which the artificial precipitation appears on the numerical model is the same as the direction of the precipitation band, the non-seeding effect area B3 is set around the seeding line (black solid line in the domain) on up wind on the aircraft experiment district. In this case, if the rain gauges to be analyzed in the non-seeding effect area B3 are lacking, like the case where artificial precipitation experiment is conducted on the sea, the non-seeding effect area B3 is adjusted to an area including the seeding line to the maximum and thus determined (at step S23a).

If it is determined that the direction along which the artificial precipitation appears on the numerical model is not the same as the direction of the precipitation band (for example, in the case of mountainous areas), the non-seeding effect area B3 is determined around the strongest precipitation point among the same natural precipitation system as of the seeding effect area B2, while being not overlaid onto the simulation area B1 (at step S23b).

Like this, the method for determining the seeing effect area B2 and the non-seeding effect area B3 temporarily and spatially in accordance with the wind system using the precipitation change simulation data, the radar accumulated precipitation data, and the ground accumulated precipitation data has been explained with reference to FIG. 2.

EMBODIMENTS

<First Embodiment> Analysis Result of Fine Particle Reduction Experiment

In the case of an artificial precipitation experiment conducted to reduce fine particle concentration in a capital region on Nov. 1, 2020, a seeding effect area B2 and a non-seeding effect area B3 were separated. FIGS. 3A to 3C show the numerical simulation precipitation changes and the ground and radar accumulated precipitation changes for five hours between 13:00 and 18:00.

As appreciated from FIGS. 3A to 3C, a simulation area B1, which includes the West sea, capital regions, and Gangwon-do, was widely determined. The seeding effect area B2 was determined in the range of 50 km×50 km around Seoul where radar precipitation change was greatest in the simulation area B1. As the direction of numerical simulation artificial precipitation and the moving direction of a precipitation band were the same as each other northeastward, the non-seeding effect area B3 was set around a seeding line on up wind. In this case, because the experiment was conducted on the sea, rain gauges to be analyzed were lacking, and accordingly, the non-seeding effect area B3 was somewhat moved to the right to include the seeding line in the range of being not overlaid onto the simulation area B1 and thus determined to the range of 50 km×50 km. If the increased precipitation of the seeding effect area B2 and the non-seeding effect area B3 is calculated according to the method of the prior art, the calculated precipitation is listed in Table 1.

TABLE 1

Increased precipitation calculation result on the experiment conducted on Nov. 1, 2020

| | Accumulated Precipitation | | | | | |
|---|---|---|---|---|---|---|
| | Ground (13:00 to 18:00) | | | Radar (13:00 to 18:00) | | |
| Statistic | Seeding effect area | Non-seeding effect area | Increased artificial Precipitation (seeding − non-seeding) | Seeding effect area | Non-seeding effect area | Increased artificial Precipitation (seeding − non-seeding) |
| Average (mm) | 7.28 | 4.50 | 2.78 (Increased) | 5.83 | 3.00 | 2.83 (Increased) |

As appreciated from Table 1, average increased precipitation in the accumulated precipitation is 2.78 mm on ground and 2.83 mm on radar, which are similar to each other. According to the prior art, 2.78 mm as a difference between the ground average accumulated precipitation of the seeding effect area B2 and the non-seeding effect area B3 is increased artificial precipitation available through the experiment. If the increased artificial precipitation is determined, it is multiplied by precipitation area and precipitation density to calculate total artificial precipitation. According to the prior art, the effective area of 8,793 km$^2$ on which the increased accumulated precipitation of the numerical model as shown in FIGS. 3A to 3C is greater than or equal to 0.1 mm and the precipitation density of 1 g/cm$^3$ are applied, the total artificial precipitation is 24,444,540 tons. That is, it is predicted that about 24,400,000 tons of water may be available through the experiment conducted to reduce fine particle concentration in a capital region.

<Second Embodiment> Analysis Result of Forest Fire Prevention Experiment

Figure 4A:
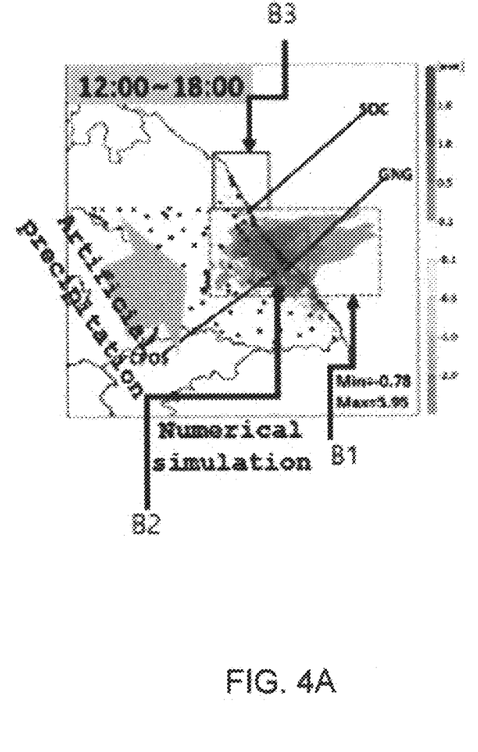
FIGS. 4A to 4C are domain images on which numerical simulation precipitation changes and ground and radar accumulated precipitation changes are indicated by simulation areas B1, seeding effect areas by B2, non-seeding effect areas by B3, seeding lines by black solid lines, cloud physics observatory by CPOS, Sokcho by SOC, and Gangneung by GNG.
Figure 4B:
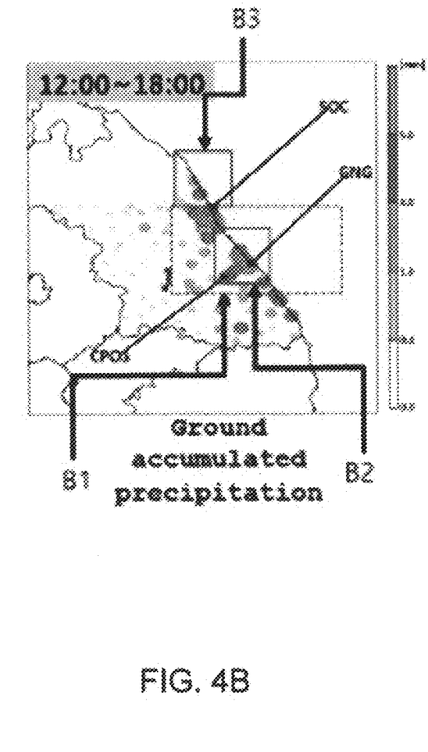
Figure 4C:
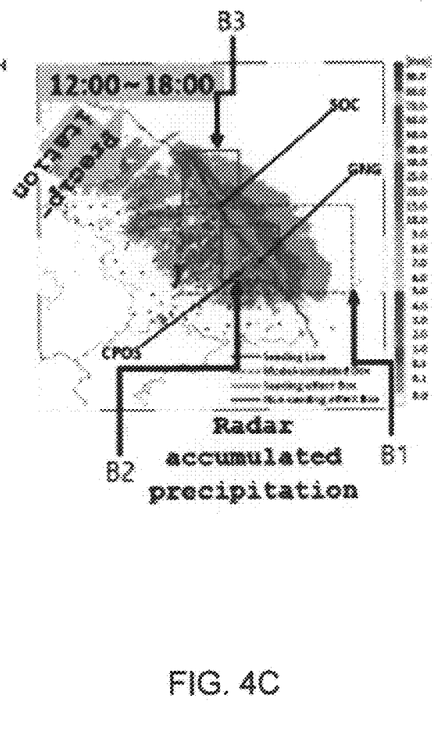

In the case of an artificial precipitation experiment conducted to prevent a forest fire in Gangwon-do on Mar. 27, 2020, a seeding effect area B2 and a non-seeding effect area B3 were separated, which are shown in FIGS. 4A to 4C.

FIGS. 4A to 4C are domain images on which numerical simulation precipitation changes and ground and radar accumulated precipitation changes are indicated by simulation areas B1, a seeding effect area by B2, a non-seeding effect area by B3, a seeding line by a black solid line, cloud physics observatory by CPOS, Sokcho by SOC, and Gangneung by GNG.

Analysis time was determined for six hours between 12:00 and 18:00 in a numerical model. The experiment was the experiment analyzed in the prior art, and through the method according to the present invention, the seeding effect area B2 and the non-seeding effect area B3 are re-analyzed.

As appreciated from FIGS. 4A to 4C, the simulation area B1 was determined as an area ranging from the seeding line located on the Yeongseo region, Gangwon-do to the East sea. The seeding effect area B2 was determined in the range of 50 km×50 km around Gangneung where radar precipitation change was greatest in the simulation area B1. In this case, as the direction (toward northeast) of numerical simulation artificial precipitation was different from the moving direction (toward southeast) of a precipitation band, the non-seeding effect area B3 was not overlaid onto the simulation area B1 and was thus determined in the range of 50 km×50 km on the Northeast region, Gangwon-do where the same natural precipitation system as in the seeding effect area B2 appears strongly. If the determined two areas are analyzed to calculate increased precipitation, the calculated increased precipitation is listed in Table 2.

TABLE 2

| | Accumulated Precipitation | | | | | |
|---|---|---|---|---|---|---|
| | Ground (12:00 to 18:00) | | | Radar (12:00 to 18:00) | | |
| Statistic | Seeding effect area | Non-seeding effect area | Increased artificial Precipitation (seeding − non-seeding) | Seeding effect area | Non-seeding effect area | Increased artificial Precipitation (seeding − non-seeding) |
| Average (mm) | 4.39 | 2.33 | 2.06 (Increased) | 3.70 | 2.02 | 1.68 (Increased) |

As appreciated from Table 2, average increased precipitation in the accumulated precipitation for six hours is 2.06 mm on ground and 1.68 mm on radar, and in this case, the ground precipitation is greater than the radar precipitation because the experiment is conducted on Gangwon-do with lots of mountainous areas so that a deviation in the ground precipitation is big. Accordingly, increased artificial precipitation on the seeding effect area B2 is 2.06 mm when compared to the non-seeding effect area B3. If an effective area of 2.731 km² and a precipitation density of 1 g/cm³ are applied to the calculated increased artificial precipitation, total artificial precipitation is 5,626,860 tons. That is, it is predicted that about 5,600,000 tons of water may be available through the artificial precipitation experiment conducted to prevent the forest fire on Gangwon-do.

As described above, the method according to the present invention can use the numerical simulation data, the radar precipitation data, and the ground precipitation data to systematically specify the steps of determining the seeding effect area and the non-seeding effect area in accordance with the wind system.

Moreover, the method according to the present invention can easily divide the seeding effect area and the non-seeding effect area according to the physical properties of clouds and quantitatively verify the effectiveness of artificial precipitation experiments conducted by purpose in the future.

Further, the method according to the present invention can perform analysis of differences between physical characteristics of the seeding effect area and the non-seeding effect area and calculation of the amount of water available through the artificial precipitation experiment in the short term and perform utilization of the water available through the experiment and the generation of economical profits through the water utilization in the long term.

In addition, the method according to the present invention can be desirably utilized to improve numerical model predictive performance using observation data, to develop cloud physics studies through improvement of verification equipment, and to analyze the influence of the precipitation system such as localized heavy rain, Typhoon, and the like on a corresponding district.

Accordingly, the method for determining the seeding effect area and the non-seeding effect area in accordance with the wind system according to the present invention can be applied to industrial fields capable of conducting artificial rain or snow experiments using meteorological conditions.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for determining an effect of seeding a seeding area, comprising:
   setting a time over which effectiveness of a seeding operation in the seeding area will be evaluated;
   establishing via numerical modeling an area over which effects of seeding the seeding area are expected to be experienced and a modeled direction of artificial precipitation;
   seeding the seeding area;
   measuring radar accumulated precipitation in the area over the time;
   determining a direction of a natural precipitation band in the area over the time;
   identifying a seeding effect area where radar accumulated precipitation change is greatest within the area over the time;
   comparing the modeled direction of artificial precipitation to the direction of the natural precipitation band over the time;
   locating a non-seeding effect area over the time as a function of a comparison of the modeled direction of artificial precipitation and the direction of the natural precipitation band; and
   determining the effect of seeding the seeding area as a function of subtracting precipitation in the non-seeding effect area over the time from precipitation in the seeding effect area over the time.

2. The method for determining the effect of seeding in the seeding area as set forth in claim 1, wherein the non-seeding effect area is located as a function of the comparison of the modeled direction of artificial precipitation and the direction of the natural precipitation band by locating the non-seeding effect area around a seeding line when the modeled direction of artificial precipitation and the direction of the natural precipitation band are the same, and locating the non-seeding effect area around a strongest precipitation point among the natural precipitation band when the modeled direction of artificial precipitation and the direction of the precipitation band are not the same.

\* \* \* \* \*